United States Patent

[11] 3,630,616

| [72] | Inventor | Frank Geoffrey Everest<br>Stevenage, England |
|------|----------|---|
| [21] | Appl. No. | 803,706 |
| [22] | Filed | Mar. 3, 1969 |
| [45] | Patented | Dec. 28, 1971 |
| [73] | Assignee | British Aircraft Corporation Limited<br>London, England |
| [32] | Priority | Mar. 6, 1968 |
| [33] | | Great Britain |
| [31] | | 10,958/68 |

[54] RANGE FINDERS
4 Claims, 6 Drawing Figs.

| [52] | U.S. Cl. | 356/4, 343/7.3 |
|------|----------|----------------|
| [51] | Int. Cl. | G01c 3/08 |
| [50] | Field of Search | 356/4, 5; 343/7.3 |

[56] References Cited
UNITED STATES PATENTS

| 3,503,680 | 3/1970 | Schenkerman | 356/5 |
| 2,975,299 | 3/1961 | Mintzer | 343/7.3 |
| 3,243,803 | 3/1966 | Thue | 343/7.3 |
| 3,402,630 | 9/1968 | Blau et al. | 356/5 |

FOREIGN PATENTS

| 957,235 | 5/1964 | Great Britain | 244/14 L |

Primary Examiner—Rodney D. Bennett, Jr.
Assistant Examiner—S. C. Buczinski
Attorney—Sughrue, Rothwell, Mion, Zinn & Macpeak ABSTRACT: In a laser range finder a short ramp voltage is generated after each laser pulse and a long sweep voltage has a progressive voltage variation extending over a number of cycles of the short ramp voltage. Each time that a short ramp voltage waveform crosses the instantaneous value of the long sweep voltage, two successive gating signals are generated. If a reflected laser pulse arrives within the total gating interval, the progressive variation of the sweep waveform is halted and the difference in signal in the successive gating interval is used to center the total gating interval on the reflected laser pulse. A DC clamp restores the DC level of the sweep voltage generator after each pair of gating signals.

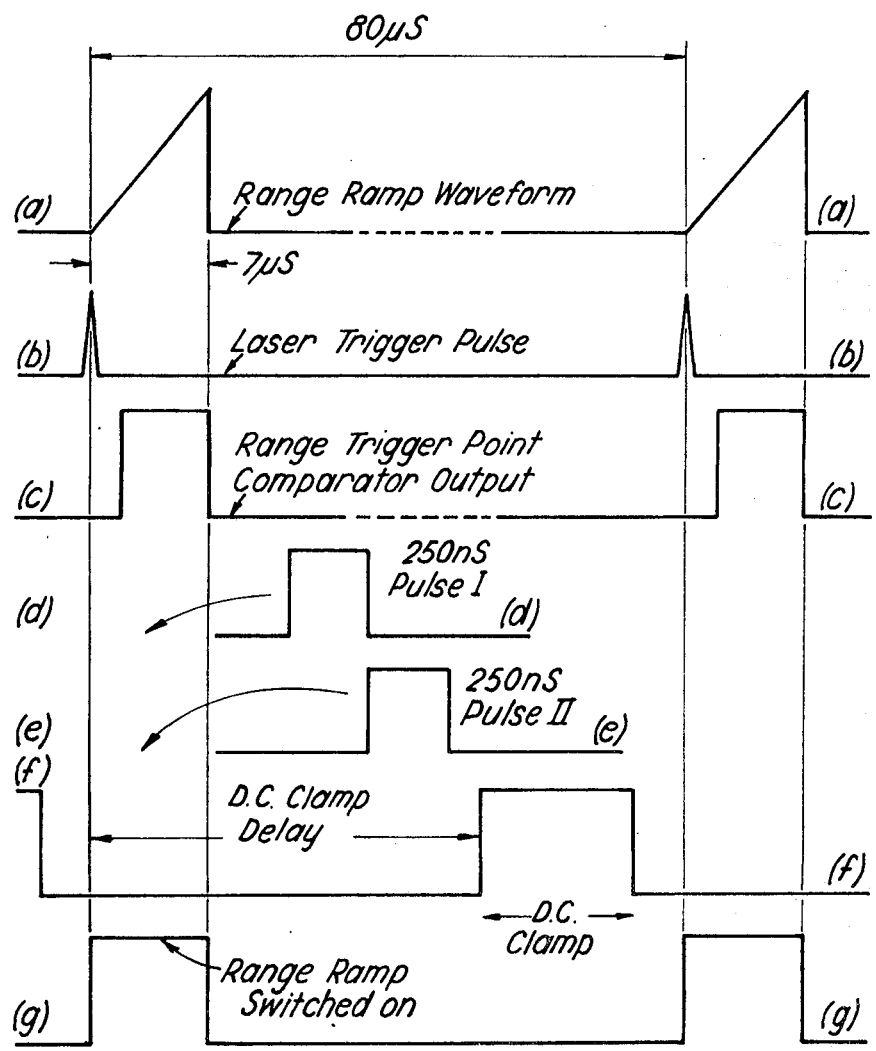

500 nS Pulse 250 nS Pulse I 250 nS Pulse II

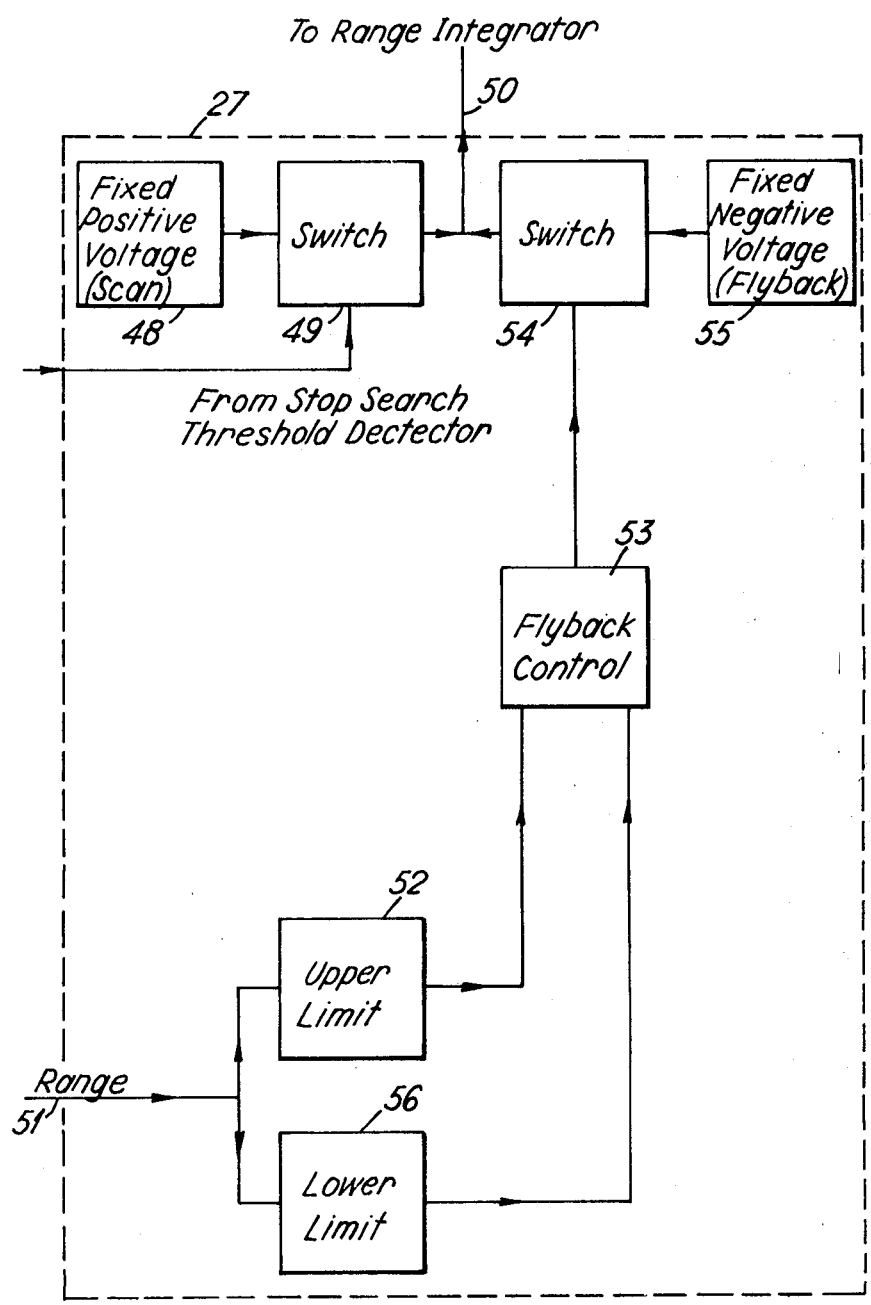

RANGE FINDERS

This invention is concerned with laser range finders and in particular with a range finer which will seek an object throughout a predetermined range variation and which will lock its range setting to the range of the located object.

A range finder according to the present invention comprises: a laser for emitting a succession of light pulses and a ramp generator producing a ramp voltage following the transmission of each laser pulse; a range search generator producing a sweep signal having a progressive voltage variation extending over a number of ramp voltage cycles; a gate generator responsive to the ramp voltage and the sweep generator voltage and operating each time the value of the ramp voltage passes that of the sweep generator voltage to generate a gating signal which exists for a predetermined interval; a detector for converting a reflected laser pulse into an electric signal; a gating circuit controlled by the gating signal to pass the said electric signal only if it arrives within the gating interval; and means responsive to the presence of an electric signal, corresponding to a reflected laser pulse, in the output of the gating circuit to control the output of the range search generator so that the gating interval defined during the next ramp waveform will include an electric signal from the detector occurring at the same time in the next ramp waveform. The output of the range search generator represents the range of an object from which the reflected pulse was received. Preferably, a circuit responsive to the instant of occurrence of the electric signal derived from the reflected laser pulse in relation to the midpoint of the gating interval adjusts the output of the range search generator so that if an electric signal derived from a reflected laser pulse arrives at the same time in the next ramp waveform the midpoint of the gating interval will be closer to the instant of arrival of a corresponding electric signal derived from a reflected laser pulse. Such a range finder centers its gating interval on the incoming signal and, if the object from which the reflection is received changes its range, it continuously adjusts the gating interval to move its midpoint toward the new time position of the incoming signal. It is desirable to have, in addition to a first control loop for centering the gating interval on the incoming signal, a second control loop to stop the progressive variation of the sweep signal from the range search generator. This second loop is not essential but in its absence there is a standing error because the first control loop produces a slight offset in the time position of the gating interval to balance the increment in the sweep signal.

In order that the invention may be better understood, one example will now be described with reference to the accompanying drawings, in which:

FIG. 3 is a timing diagram for waveforms resulting from the circuit to FIG. 2; and FIGS. 4, 5 and 6 show in greater detail parts of the block diagram of FIG. 2.

Figure 1:
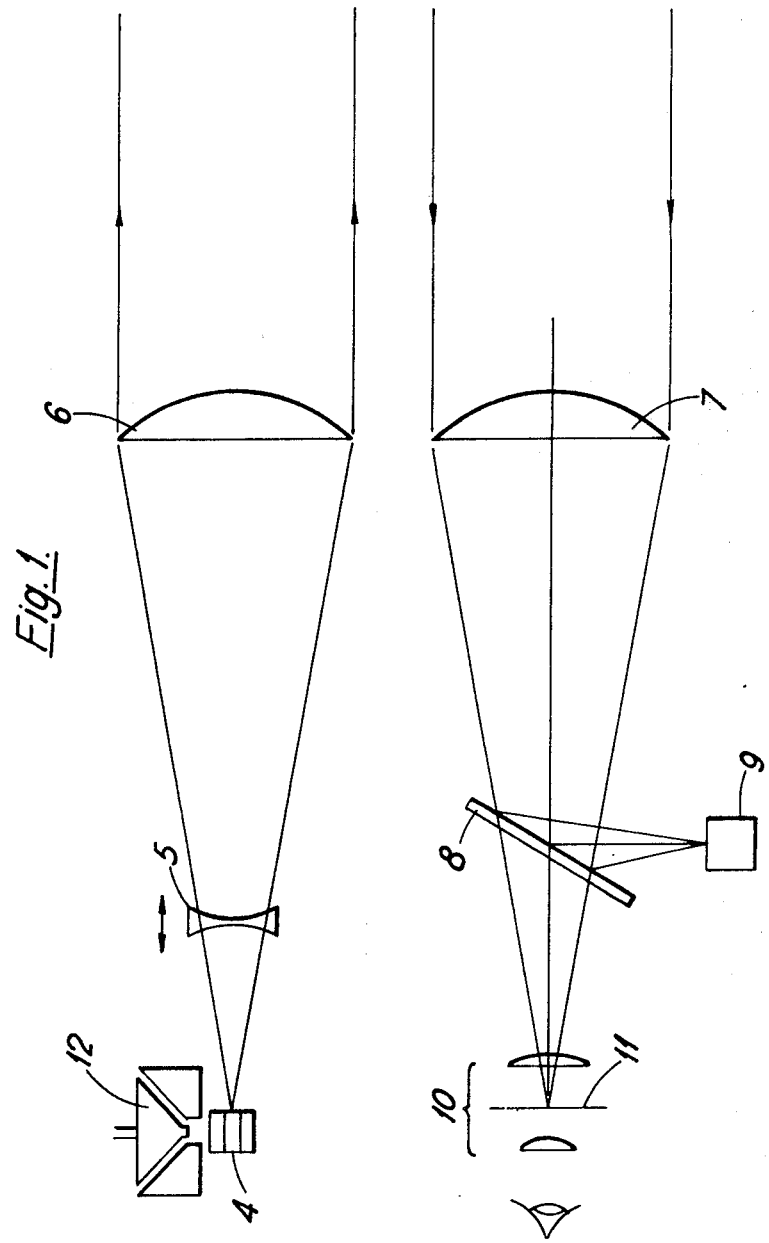
FIG. 1 shows the optical arrangement of the range finder.

As shown in FIG. 1, the beam of a gallium arsenide laser 4 is transmitted through a movable focusing lens 5 and a main transmitter imaging lens 6, mounted in a first tube (not shown), on to a target. Light reflected from the target enters a second tube housing a sight objective 7 and a dichroic mirror 8 which diverts some of the light on to a silicon photodetector 9 and passes the remainder to an eyepiece 10 including a graticule system 11. In this apparatus, the movable focusing lens is driven by a range servo, which will be described in connection with FIG. 2. The temperature variation of the laser is reduced by means of a cooler assembly 12.

Figure 2:
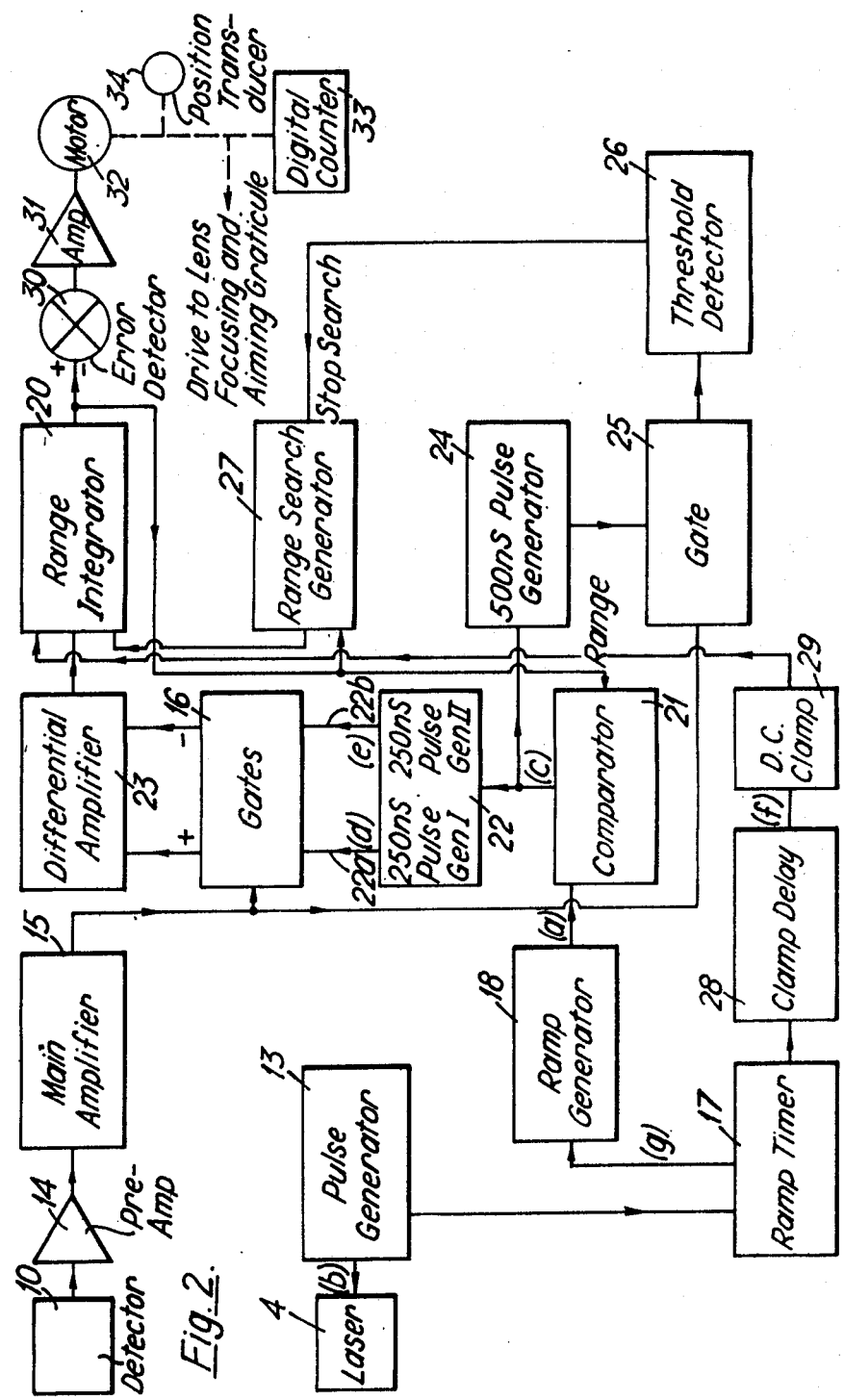
FIG. 2 is a block diagram of the electronic circuits of the range finder.
Figure 5:
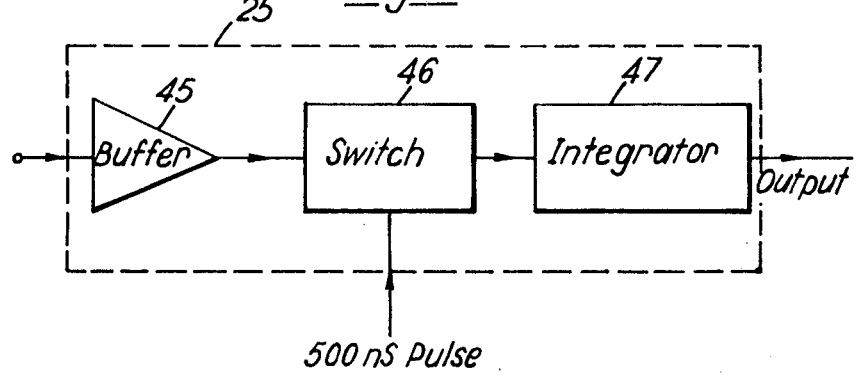

In FIG. 2, a pulse generator 13 energizes the laser 4 and the reflected energy is picked up by the detector 10 and fed through a preamplifier 14 and a main amplifier 15 to signal gates 16 (see also FIG. 5).

For every laser pulse, the pulse generator 13 applies a trigger pulse to a range ramp timer 17 which is a triggered monostable circuit. The timer 17 sends a switching signal shown at waveform (g), FIG. 3, to a range ramp generator 18 (a conventional "bootstrap" ramp generator).

The latter provides a pulse after a delay to restore the DC input of a range integrator 20. The laser trigger pulse is shown at (b) in FIG. 3 and the range ramp waveform is shown at (a). In this example the interval between laser trigger pulses is 80 microseconds and the duration of the range ramp waveform is about 7 microseconds, a value slightly more than the maximum range for which the instrument is designed to work.

The range integrator 20 also provides an output in the form of a progressively varying voltage and it has the same range of output voltages as the ramp generator. It is a conventional integrator with several input resistors connected to a virtual earth point and a feedback capacitor connected from the output to the virtual earth point. However, the duration of a single sweep from the range integrator is 1 second—many times the repetition rate of the ramp voltage from the generator 18. The output of the ramp generator 18 and the output of the range integrator 20 are compared in a range trigger point detector 21, which is a differential amplifier. Whenever the range ramp voltage passes the slow range integrator sweep, the detector 21 generates at its output a range trigger pulse, the leading edge of which is shown in an arbitrary time position at (c) of FIG. 3. The range trigger pulse is fed to a pulse generator unit 22 consisting of two conventional pulse generators. The first is triggered by the edge of the range trigger pulse from detector 21 and generates a 250 nanosecond pulse. The second is triggered by the end of the latter pulse and generates a further 250 nanosecond pulse. Thus the unit 22 generates on conductors 22a and 22b two successive gating pulses, each 250 nanoseconds in length, shown in exaggerated form at (d) and (e) of FIG. 3. These pulses open the signal gates 16 and pass the output of the main amplifier 15 through to a pulse differential amplifier 23. The output from the main amplifier 15 when the gates are open normally consists of noise, but if one of the gates happens to be open at an instant separated from the laser pulse by an interval corresponding to the correct range, the signal passing through the gate will also contain a pulse which has been received from the target. Such a signal causes the application of a signal to the pulse differential amplifier, the signal being positive if it occurs within the first gating period, and negative if it occurs within the second gating period. The output from the differential amplifier 23 is the difference between the two input signals and is fed to the range integrator 20. If most of the pulse trigger energy is in one of the gating periods, the integrator output changes so that the range trigger point is shifted to alter the timing of the gating periods so that the pulse energy is equally contained in the two gating periods. Thus, the pulse is correctly centered within the combined gating interval.

The range integrator output voltage is proportional to range. A search generator 27 (see also FIG. 6) feeds a fixed current into the range integrator so that the output scans, in one second, from a voltage equivalent to maximum range to zero. If no signal has been acquired, the range integrator 20 flies rapidly back to maximum range and again scans towards zero range.

It will be seen that when a target is acquired by the circuit loop including the range integrator 20 and the range trigger point detector 21 a fixed error is introduced by the range scan signal from the generator 27, since the loop will adjust itself to such a range error that the range scan input signal will be exactly balanced by the range error signal. To prevent this, a second detection system is used to stop searching by removing the search input signal from the range integrator; the loop then adjusts itself to zero range error.

To stop the search, the output signal from the range trigger point detector is fed to a pulse generator 24 which when triggered by the leading edge of this signal, generates a 500 nanosecond pulse covering the period during which the signal gates 16 are open and which uses this pulse to open a further gate 25 (see also FIG. 5). The signal from the main amplifier is applied directly to the gate 25 and, if this gate is open, passes through to a conventional threshold detector 26. If a signal having a level above a preset threshold is present in the circuit 26, an output signal is applied to the range search generator 27 to remove the search signal from the range integrator 20. This prevents range "pulling" due to the scanning signal. In addition, the time constant of a stop search integrator in the threshold detector circuit 26 is arranged so that it acts only when a large number of pulses are received and thus does not respond to spurious signal detection.

DC clamping is accomplished by grounding all the input terminals of the range integrator 20 during a nonoperative part of the cycle. This is done by means of a clamping delay circuit 28 and a DC clamp 29. The delay circuit 28 is brought into operation by a signal from the range ramp timer 17. It consists of a monostable delay circuit followed by a monostable pulse generator. On receipt of the ramp timer signal it initiates a 60 microsecond delay and then switches on the clamp circuit 29 for about 10 microseconds so that the clamp is removed again a few microseconds before the next laser pulse is transmitted. The clamp waveform is shown at (*f*) in FIG. 3. The periodic clamping does not appreciably affect the progressive variation of the output of the integrator 20 during its slow scan.

The output of the range integrator is used to drive a servomechanism. The principal elements of this servomechanism, which is of conventional design, are an error detector 30, an error amplifier 31 and a motor 32. The motor 32 drives, through gearing, the lens-focusing mechanism and the adjusting means for the aiming graticule. The servomechanism also drives a digital counter 33 to provide a visual indication of range and also a position transducer 34.

In the form shown, the indicator "hunts" in periods before a target signal has been acquired; this avoids the risk that a stationary reading during such a period might be mistaken for an indication of target acquisition.

The size of the laser beam is controlled by the focusing lees and in the example described is always set to give a beam 1 meter square on the target no matter what the range. When the movable graticule has been set by the servomechanism, the operator sights on the target using this graticule, which can only be seen when the laser is in operation.

Figure 4:
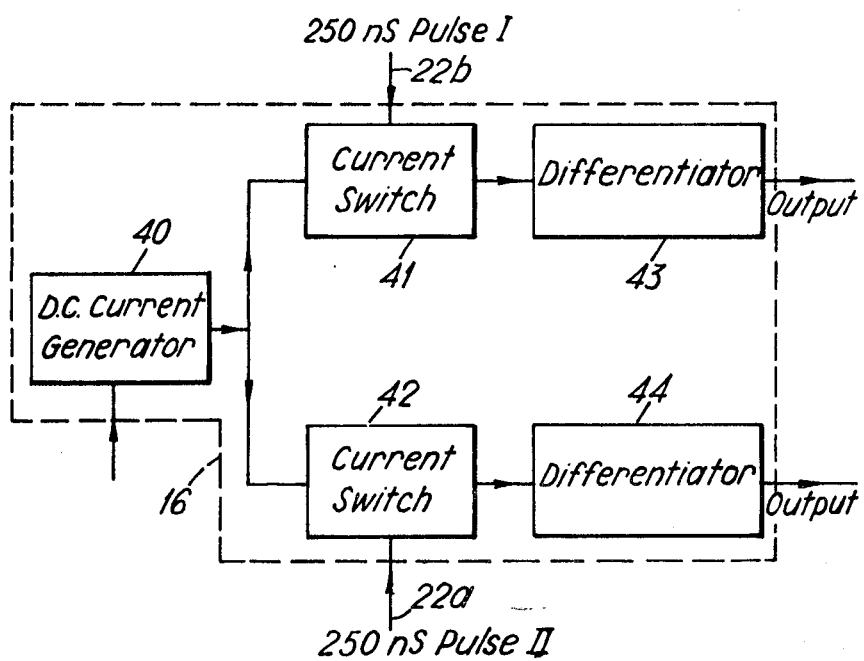

FIG. 4 shows in greater detail the signal gate circuit 16. The signal from the amplifier 15 varies the current output of a DC current generator 40. The output of the current generator 40 is applied to each of two current switches 41 and 42 which are controlled respectively by the successive 250 nanosecond pulses on conductors 22a and 22b. Signals occurring at the outputs of the current switches are differentiated in differentiating circuits 43 and 44 respectively before being applied to the differential amplifier 23.

The signal gate 25 is shown in FIG. 5. The incoming signal is applied through a buffer circuit 45 to a switch 46 opened by the 500 nanosecond pulse from the pulse generator 24. Signals occurring during the pulse period are integrated in an integrator 47 before passing to the threshold detector 26.

The range search generator 27 is shown diagrammatically in FIG. 6. During the normal 1-second range scan, a fixed positive voltage source 48 supplies current through a switch 49 to an output conductor 50 leading to an input resistor of the range interator 20. If a "stop search" signal is received from the threshold detector 26 before the end of the scan, this signal closes the switch 49 and thereby isolates conductor and the range integrator from the source 48. If no stop search signal is received, at the end of the scan the range input on conductor 51 from the range integrator will reach a value above the maximum range limit and will cause an upper limit circuit 52 to send a flyback-initiating signal to a logic circuit 53. This latter circuit then renders conducting a switch 54 to connect a fixed negative voltage source 55 to the conductor 50, the value of the negative source being such as to cause a rapid flyback of the range integrator output. At the end of the flyback, the range signal on conductor 51 will be such that a lower limit circuit 56 will cause the logic circuit 53 to render the switch 54 nonconducting.

In the apparatus described the laser may play an important part in the guidance of a missile on to the target, the rangefinder being then used for switching on the laser when missile guidance is required. It may also be used for setting gun elevation and other gun laying operations.

I claim:

1. A laser range finder comprising:
   a laser for emitting a succession of light pulses;
   a ramp generator producing a ramp voltage following the transmission of each laser pulse;
   a range sweep generator producing a sweep signal having a progressive voltage variation extending over a number of ramp voltage cycles;
   a gate generator responsive to the ramp voltage and the sweep generator voltage and operating each time the value of the ramp voltage passes that of the sweep generator voltage to generate a gating signal which exists for a predetermined interval;
   a detector for converting a received reflected laser pulse into an electric signal;
   a pair of gating circuits controlled by the gating signal so that they define first and second successive gating intervals, each gate circuit being operative to pass said electric signal from said detector only if it arrives within the corresponding gating interval;
   means responsive to an excess of said electric signal passed in one of said gating intervals relative to the electric signal passed in the other of said gating intervals for modifying the output of the range sweep generator in a direction such that the timing of the gating intervals in relation to an electric signal from said detector occurring at the same time in the next ramp waveform results in a reduction in said signal excess; and
   a DC clamping circuit operative following each pair of gating intervals to restore the DC level of said range sweep generator.

2. A laser range finer in accordance with claim 1 further comprising sweep control means for stopping the progressive voltage variation of the sweep signal from the range sweep generator, and said sweep control means for further comprising a circuit responsive to the presence of an electric signal from said detector during said first or said second gating interval and having a time constant such that said progressive variation is stopped only when a number of said electric signals has been received from said detector following a number of successive laser pulses.

3. A laser range finder in accordance with claim 2 wherein said sweep control means further comprises:
   a third gate operating in timed relationship with said first and second gates so as to be in signal-passing condition for a period consisting of the total duration of said first and second gating intervals; and
   means responsible to the passage of a signal, corresponding to a reflected laser pulse, by said third gate for stopping the progressive voltage variation of said sweep signal from said range sweep generator.

4. A laser range finder in accordance with claim 1 wherein said range sweep generator comprises a pair of current sources of opposite polarities and an integrator for generating said sweep signal and a flyback signal, switching means connected between one of said current sources and said integrator, and a control circuit connected to receive a signal from said range sweep generator and operative to actuate with switching means when said sweep generator signal has a value between predetermined upper and lower limits, said limits corresponding to the ends of the required sweep signal variation.

\* \* \* \* \*